April 15, 1947.                C. SAFFORD                2,419,037
                               FISHING LURE
                            Filed July 18, 1944

INVENTOR.
Claude Safford
BY A. B. Bowman
Attorney

Patented Apr. 15, 1947

2,419,037

UNITED STATES PATENT OFFICE 2,419,037

FISHING LURE

Claude Safford, San Diego, Calif.

Application July 18, 1944, Serial No. 545,458

3 Claims. (Cl. 43—42)

My invention relates to a lure to be used for fishing purposes and the objects of my invention are:

First, to provide a fishing lure which will not snag or get caught in debris in the water such as vegetable growth or the like:

Second, to provide a fishing lure that is readily shiftable along the fishing line so that when the fish is caught in the hook, the hook and line are taken through the lure so that the hook means is clear away from the lure when the fish is on the hook;

Third, to provide a lure of this class with means for centering the hook relative to the lure when using the same for trolling purposes or otherwise;

Fourth, to provide a fishing lure of this class with novel means of securing the lure guard;

Fifth, to provide a means of this class with novel means of securing the hook shield;

Sixth, to provide a lure of this class in which the action of the fish takes the hook entirely away from the lure as soon as the fish is caught on the hook;

Seventh, to provide a novel connection between the hook means and the lure when used for lure purposes; and Eighth, to provide a fishing lure of this class which is very simple and economical of construction, easy to operate, efficient in its action, and which will not readily deteriorate or get out of order.

Figure 1:
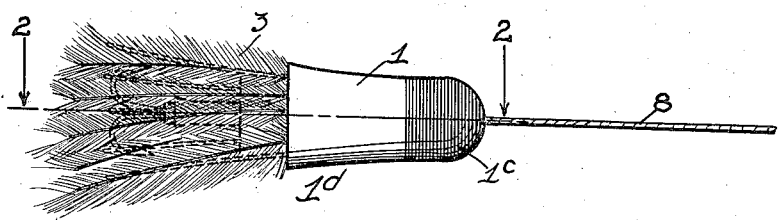
Figure 2:
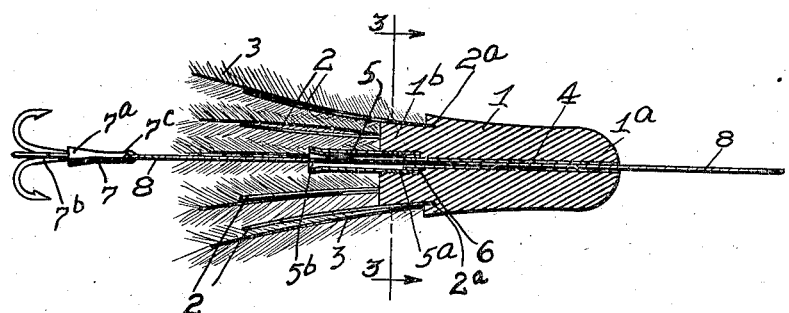
Figure 3:
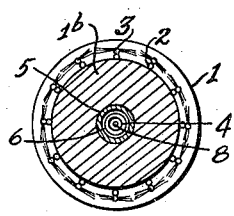

With these and other objects in view, as will appear hereinafter, my invention consists of certain novel features of construction, combination and arrangement of parts and portions, as will be hereinafter described in detail and be particularly set forth in the appended claims, reference being had to the accompanying drawings and to the characters of reference thereon which form a part of this application in which:

Figure 1 is a side elevational view of my lure, Fig. 2 a sectional view taken from the line 2—2 of Fig. 1 showing some of the parts in elevation to facilitate the illustration and showing the hook means removed from the lure in the position it would be after the fish had grabbed the hook, and Fig. 3 an enlarged sectional view taken on the line 3—3 of Fig. 2.

Similar characters of reference refer to similar parts and portions throughout the several views of the drawings:

The body member 1, guard members 2, hook shield members 3, line sleeve member 4, hook supporting sleeve member 5, collar 6, hook means 7 and line 8 constitute the principal parts and portions of my fishing lure.

The body member 1 is a slightly curved tapering cylindrical member made of wood or other material dependent upon its use. It is provided with a front rounded end, 1a, which is semi-spherical in shape, and at its rear end it is provided with a reduced portion, 1b, which is tapered so that it enlarges backwardly as shown best in Fig. 2 of the drawings. At its front end and extending for about one-third of its length, the body member is painted red or some bright color at 1c while the remainder of the body portion is painted preferably white or a varying color from the portion 1c. Mounted on the reduced portion 1b of the body member 1 and extending into the body portion at 2a, shown best in Fig. 1 of the drawings, are the guard members 2 which are preferably made of wire or other relatively stiff material. The guard members extend outwardly in diverging relation to each other, as shown in the drawings, it being noted that these guard members rest against the tapering portion of the outer surface of the portion 1b to provide for secured diverging relation of these members which are positioned in spaced relation around this portion 1b and secured into the body portion. Also mounted on this portion 1b is a plurality of hook shield members 3 which extend backwardly in diverging relation to each other outwardly of said guard members 2, the guard members 2 forming supports for the hook shields. The shield shown is composed of a plurality of spaced feathers with their stem portions secured on the portion 1b and the feather portions extending backwardly over the hook member as shown best in Fig. 1 of the drawing.

Mounted centrally in longitudinal position in the body 1 is a line sleeve 4 the inside diameter of which is slightly greater than the diameter of the line so that the line will slip readily therein. This sleeve member extends from the front end to near the back end of the body member 1 as shown best in Fig. 2 of the drawings.

Extending into the back end of the body member 1 and threadedly connected thereto is a hook-supporting sleeve member 5, the forward end of which is turned back within itself to form a collar 6 whose inside diameter is substantially equal to the outside diameter of the sleeve member 4, said sleeve members being disposed in telescopic relation and in functional engagement to each other. The outer or back end of the sleeve member 5 is provided with a tapered portion 5b which is adapted to receive the wedge portion 7a of the hook means 7 when the hook is up in position as shown in Fig. 1 of the drawings. Secured to this wedge portion 7a are the hooks 7b. In this case I have shown a cluster of three hooks, although there may be one or more as desired. The front portion of the member 7a is provided with eye 7c in which is mounted the line 8. This line 8 passes forwardly inside of the sleeve 5, collar 6 and sleeve 4 and forwardly so that the lure body member is adapted to shift easily on the line 8 at all times. When fishing, trolling, or the like, the member 7 is positioned tightly in the beveled portion 5b of the sleeve 5, as shown in Fig. 1 of the drawings, while after a fish is caught on the hook, the hook and line is withdrawn as, shown in Fig. 2 of the drawing, leaving the lure to play on the line at any place and separate from the fish and hook.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a fishing lure of the class described, the combination of a tapered body member provided with a reduced portion at its rear end, a plurality of backwardly diverging separate spaced apart guards secured on said reduced portion at their forward ends and extending forwardly past said reduced portion some distance, a plurality of hook shields positioned at their ends on said reduced portion outwardly of said spaced apart guards and extending backwardly and supported and reinforced by said guards, a line shiftable centrally and longitudinally in said body member, a hook mounted on the rear extended end of said line, a sleeve mounted in said body member and extending backwardly some distance from the rear end thereof provided with a diverging wall portion at its rear end, said hook means provided with a tapered wedge portion adapted to enter said converging wall and wedge tightly therein when drawn for holding the hook means straight back when inserted and a sleeve mounted centrally and longitudinally in the body member connected with said backwardly extending sleeve.

2. In a fishing lure of the class described, the combination of a body member, a fishing line freely shiftable longitudinally therein, a fishing hook means secured to the rear end of said line backwardly of said body member, a plurality of spaced wire guard members positioned on the rearward end of said body member surrounding said hook means, hook shield feathers secured to said body member and extending backwardly past the ends of said guard members and supported by said guard members outwardly of said guard members and a sleeve extending backwardly a long distance centrally from said body member surrounding said line provided with a tapered rear end portion adapted to engage the hook means for some distance for holding said hook means straight back when inserted.

3. In a fishing lure, a body member, a plurality of backwardly diverging wire guards secured on said body member and extending backwardly therefrom to form free ends, a plurality of hook shields positioned on said body member and extending backwardly past the free ends of said wire guards and supported thereby, a line shiftable in said body member, a barbed hook mounted on the rear end of said line, means for supporting said hook provided with a tapered portion, and a sleeve member mounted in said body member provided with a diverging wall portion at its rear end adapted to receive the tapered portion for securing said hook whereby said tapered portion wedges into the diverging wall portion tending to hold said hook under the protection of said wire guards and entirely hidden from view by said hook shields, said sleeve extending backwardly such a distance that the tapered portion will enter the diverging wall portion before the barbs of the hook have reached the plane of the free ends of the wire guards.

CLAUDE SAFFORD.

REFERENCES CITED

The following references are of record in the file of this patent:

UNITED STATES PATENTS

| Number | Name | Date |
| --- | --- | --- |
| 1,768,033 | Deatz | June 24, 1930 |
| 1,434,204 | Grounsell | Oct. 31, 1922 |
| 1,713,041 | Fey | May 14, 1929 |
| 699,711 | Pyott | May 13, 1902 |
| 2,157,414 | Johnson | May 9, 1939 |
| 2,332,400 | Richardson | Oct. 19, 1943 |
| 567,310 | Gaide | Sept. 8, 1896 |